United States Patent
Terrero et al.

(10) Patent No.: US 10,981,742 B2
(45) Date of Patent: Apr. 20, 2021

(54) MEDIA HANDLING BETWEEN MODULES ROBUST TO PAPER CURL

(71) Applicant: XEROX CORPORATION, Norwalk, CT (US)

(72) Inventors: Carlos M Terrero, Ontario, NY (US); Rachel Lynn Tanchak, Rochester, NY (US); Roberto A Irizarry, Rochester, NY (US); Erwin Ruiz, Rochester, NY (US); Ali R Dergham, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 190 days.

(21) Appl. No.: 16/391,428

(22) Filed: Apr. 23, 2019

(65) Prior Publication Data
US 2020/0339374 A1 Oct. 29, 2020

(51) Int. Cl.
*B65H 29/24* (2006.01)
*B65H 29/70* (2006.01)
*B65H 29/16* (2006.01)
*H04N 1/00* (2006.01)
*B65H 5/22* (2006.01)

(52) U.S. Cl.
CPC ........... *B65H 29/248* (2013.01); *B65H 5/228* (2013.01); *B65H 29/16* (2013.01); *B65H 29/242* (2013.01); *B65H 29/70* (2013.01); *H04N 1/00647* (2013.01); *B65H 2406/11* (2013.01); *G03G 2215/00662* (2013.01)

(58) Field of Classification Search
CPC .. B65H 5/228; B65H 29/248; B65H 2406/10; B65H 2406/11; B65H 2406/111; B65H 2406/1115; B65H 2406/12; B65H 2406/121; B65H 2406/122; B65H 2406/1222; B65H 29/58; B65H 2801/06; B65H 29/70; B65H 29/16; B65H 29/242
See application file for complete search history.

(56) References Cited

U.S. PATENT DOCUMENTS

| | | | | |
|---|---|---|---|---|
| 4,197,971 A | * | 4/1980 | Stibbe | B65H 23/24 242/615.11 |
| 4,197,972 A | * | 4/1980 | Daane | B65G 51/03 242/615.12 |
| 4,300,714 A | * | 11/1981 | Dahl | B65H 23/0258 242/615.12 |
| 5,242,095 A | * | 9/1993 | Creapo | B65H 23/24 242/615.12 |
| 8,794,624 B2 | | 8/2014 | Herrmann | |
| 8,840,105 B1 | * | 9/2014 | Priebe | B65H 5/004 271/193 |
| 8,936,243 B1 | * | 1/2015 | Muir | B65H 5/26 271/302 |
| 9,079,736 B1 | * | 7/2015 | Muir | B65H 23/038 |
| 9,120,634 B1 | * | 9/2015 | Muir | B65H 5/066 |

* cited by examiner

*Primary Examiner* — Jeremy R Severson

(57) ABSTRACT

An apparatus for controlling curl in sheets between two transports includes a curved baffle placed between the two transports. A thin layer of high velocity air is applied to the curved baffle. The high velocity air layer, which will have a tendency to follow the curved baffle (Coanda effect), will divert sheets (Bernoulli effect) towards the curved baffle. By positioning the curved baffle between the two transports and by applying a uniform air stream to it, a lower pressure area will be created. This will flatten the trajectory of the sheets and ensure acquisition by the downstream transport.

18 Claims, 2 Drawing Sheets

MEDIA HANDLING BETWEEN MODULES ROBUST TO PAPER CURL

CROSS REFERENCE TO RELATED APPLICATIONS

Cross-referenced is commonly assigned U.S. application Ser. No.16/391,418, filed Apr. 23, 2019, and entitled APPARATUS FOR CONTROLLING SHEET FLATNESS UNDER AN IMAGING SYSTEM ROBUST TO MEDIA CURL by Rachel L. Tanchak et al. U.S. application Ser. No. 16/391,422, filed Apr. 23, 2019, and entitled A SYSTEM FOR PREVENTING PAPER JAMS BETWEEN SUBSYSTEM TRANSITIONS by Roberto A. Irizarry et al., both of which are included in their entirety herein by reference.

BACKGROUND

The present disclosure relates to paper handling during paper path transport within an imaging system, and more particularly, to handling sheet curl in sections of the paper path transport where sheets are unsupported, such as, the interface between two subsystems or modules.

Xerographic and ink jet digital presses include media handling configurations that have to contend with sections of the paper path where the sheet is unsupported during transition between sheet transports and affected by process speed, up curl and down curl, sheet stiffness, etc. These can further be influenced by humidity, ink placement, toner/ink amount, grain direction, paper weights, etc. Controlling the sheet trajectory may become more difficult in areas where it is prohibited to touch the top surface of the sheet with conventional devices, such as, nip rollers and baffles, as in the case of transporting pre-fused or pre-dried images.

There is currently an issue in ink jet production printing with sheets lifting, due to curl, between a marker transport and dryer modules. Attempted control of the issue is through the use of baffles that lead to image defects from the baffles contacting the wet image. Also, ink is transferred to the baffles and become contaminated or sticky, leading to jams when sheets contact the baffles. A typical decurler, as disclosed in U.S. Pat. No. 8,794,624, controls curl in only the process direction. It cannot flatten a multi-nodal curl within the sheet and localized curl due to ink that has not dried.

Therefore, there is still a need for an improvement in managing sheet curl in xerographic and inkjet imaging systems.

SUMMARY

Accordingly, in answer to this need, a system is disclosed that constrains the unsupported length of media by controlling its trajectory during a critical transition and facilitating acquisition of the media by a downstream transport. The system includes placing a curved baffle between adjacent paper path transports and applying a thin layer of high velocity uniform air flow over the curved baffle's surface to control the leading edge of a sheet. The thin layer of high velocity uniform air flow over the curved surface of the baffle will have a tendency to follow the curved baffle (Coanda effect) and divert the sheet (Bernoulli effect) towards the baffle. By positioning a curved baffle along the media path and by applying a high velocity uniform air stream to it, a lower pressure area will be created. This will flatten the sheet's trajectory so that the sheet will be reliably received by a downstream vacuum or electrostatic transport.

BRIEF DESCRIPTION OF THE DRAWINGS

Various of the above-mentioned and further features and advantages will be apparent to those skilled in the art from the specific article or methods described in the example(s) below, and the claims. Thus, they will be better understood from this description of these specific embodiment(s), including the drawing figures (which are approximately to scale) wherein:

DETAILED DESCRIPTION OF THE PREFERRED EMBODIMENT

Figure 1:
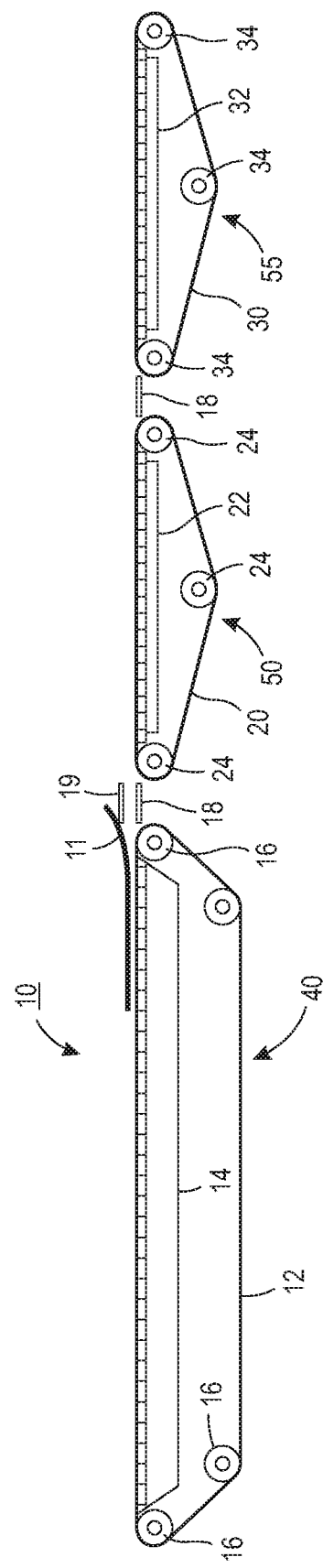
FIG. 1 is a side view of sheet transport system showing multiple sheet transports with sheet hand-off.

For a general understanding of the features of the disclosure, reference is made to the drawings. In the drawings, like reference numerals have been used throughout to identify identical elements.

A side view of a sheet transport system 10 is shown in FIG. 1 that includes a sheet 11 on a marker transport 40 conveyed towards a dryer module 50 that is upstream of a second dryer module 55. Sheet 11 has pronounced up-curl and is conveyed over marker transport 40 by belt 12 entrained around rollers 16 and over vacuum plenum 14. Dryer module 50 includes a drive belt 20 surrounding rollers 24 and has a horizontal portion overlying a vacuum plenum 22. A second and downstream dryer module 55 has rollers 34 stretching a drive belt 30 therearound with the drive belt communicating with a vacuum plenum 32. A guide member comprising a lower baffle 18 and an upper baffle 19 is positioned between marker transport 40 and dryer module 50 to facilitate sheet transfer between the marker transport and first dryer module. Controlling the trajectory of sheet 11 and preventing sheet lifting during this transition is difficult because use of conventional methods, such as, rollers and baffles can cause problems. For example, the sheet contains a wet ink image that can contact the upper baffle 19 and cause image defects. As shown, sheet 11 is held against belt 12 as it is transported with the exception of an up-curled leading edge portion that in some instances can contact upper baffle 19 as it transitions from marker transport 40 to dryer module 50. This up-curl can lead to paper jams if the sheet hits upper baffle 19 before reaching downstream transport system 50. If there is down-curl in the sheet, it can go into the gap between the marker module 40 and the guide member.

Figure 2:
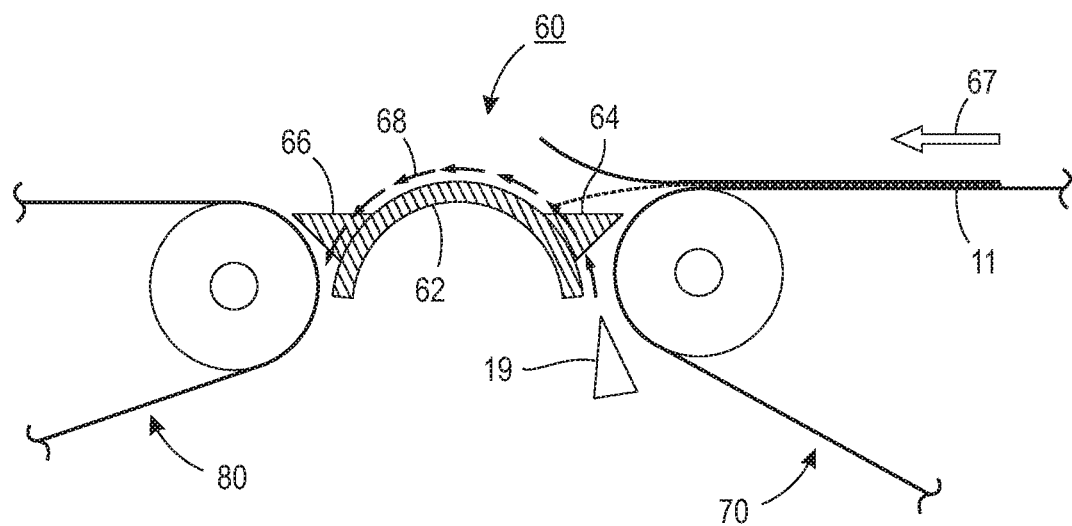
FIG. 2 is a partial side view of the present disclosure showing sheet entrance and exit ribs used in conjunction with a curved baffle to counter up-curl and down-curl in sheets conveyed between two transports.

In accordance with the present disclosure, an improved apparatus embodiment is disclosed that uses the Coanda and Bernoulli effects to control curl in transported media. In FIG. 2, a media handling apparatus 60 is shown that controls the trajectory of unsupported length of media 11 conveyed in the direction of arrow 67 in an ink jet printer environment between a marker transport 70 and dryer transport 80 by use of an air knife 19, a curved baffle 62 and entrance and exit ribs 64 and 66, respectively. This is accomplished by creating a thin layer of high velocity air in the direction of arrows 68 from nozzle 19 over curved baffle 62 under sheet 11. Control of the high velocity air flow can be defined based upon the media type and weight. The high velocity layer of air, which will have a tendency to follow the curved baffle (Coanda effect), will divert the sheet (Bernoulli effect) towards baffle 62. By positioning curved baffle 62 along the media paper path and by applying a uniform air stream to it, the air will follow the curved surface of baffle 62 and sheet 11 will follow. In addition, entrance ribs 64 with openings therein are used to provide a boundary condition for down-curled media, while simultaneously allowing air flow to pass between the ribs to enhance initial acquiring of the up-curled sheet 11. Exit ribs 66 are included to provide a boundary condition for down-curled media, while simultaneously providing a trajectory during hand-off of the media to another transport.

In recapitulation, an improved apparatus is disclosed for transitioning media between two transports that employs a curved baffle positioned between adjacent paper path transports. Uniformed high velocity air flow is applied over the surface of the curved baffle. The high velocity layer of air will follow the curvature of the curved baffle due to the Coanda effect and the media will be diverted (Bernoulli effect) towards the curved baffle. Introducing the curved baffle between the adjacent transports and applying a uniform high velocity air stream to it will cause a lower pressure area to be created that will flatten the trajectory of the media and ensure entry of the media into a downstream transport.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An apparatus for controlling curl in media conveyed in a paper path between adjacent transports, comprising:
   a first transport for conveying media to a downstream device;
   a second transport downstream of and in-line with said first transport;
   a semi-circular member positioned between said first and second transports;
   an air flow device positioned adjacent said curved member;
   entrance ribs attached to said semi-circular member and having openings therein adapted to provide a boundary condition for down-curled media while simultaneously allowing air flow from said air flow device to pass between said entrance ribs to enhance initial acquiring of media with up-curl;
   exit ribs attached to said semi-circular member and configured to provide a boundary condition for down-curled media while simultaneously providing trajectory during hand-off of the media from said first transport to said second transport; and
   wherein said air flow device is configured to apply a layer of high velocity air that follows said curved member to divert said media towards said semi-circular member and thereby remove curl from leading edges of said media.

2. The apparatus of claim 1, wherein said entrance and exit ribs are comprised of baffles.

3. The apparatus of claim 1, wherein said first transport is a marker transport and said second transport is a dryer transport.

4. The apparatus of claim 3, wherein said second transport downstream of said first transport is a vacuum transport.

5. The apparatus of claim 3, wherein second transport downstream of said first transport is an electrostatic transport.

6. The apparatus of claim 1, wherein control of said air flow device is based upon the media type and weight.

7. The apparatus of claim 1, wherein said semi-circular member is a baffle.

8. An arrangement for controlling up-curl and down-curl in media conveyed in a paper path between a marker transport and dryer module in an inkjet device, comprising:
   a marker transport for conveying media in a downstream direction;
   at least one dryer module downstream of and in-line with said marker transport and adapted to receive media from said marker transport;
   a curved member positioned between said marker and said at least one dryer module;
   an air flow device positioned adjacent said curved member;
   entrance ribs arranged with respect to said curved member and having openings therein configured to provide a boundary condition for down-curled media while simultaneously allowing air flow from said air flow device to pass between said entrance ribs to a surface portion of said curved member to enhance initial acquiring of media with up-curl;
   exit ribs configured with respect to said curved member to provide a boundary condition for down-curled media while simultaneously providing trajectory during hand-off of the media from said first transport to said second transport; and
   wherein said entrance and exit ribs each include a horizontal portion configured to provide assistance in leading down-curled media into and away from said curved member, and wherein said air flow device is configured to apply a layer of high velocity air that follows said curved member to divert said media towards said curved member and thereby remove curl from leading edges of said media.

9. The arrangement of claim 8, wherein said entrance and exit ribs are attached to said curved member.

10. The arrangement of claim 8, wherein said exit ribs are configured to allow air from said air flow device to flow through said horizontal portion thereof.

11. The arrangement of claim 8, wherein said marker transport and said at least one dryer module capture media thereon with vacuum from a vacuum source.

12. The arrangement of claim 8, wherein said curved member is a baffle.

13. The arrangement of claim 8, wherein said curved member is cylindrical.

14. The arrangement of claim 8, wherein said curved member is semi-circular.

15. An apparatus for controlling curl in sheets conveyed in a paper path between adjacent transports, comprising:
   a first transport for conveying sheets to a downstream device;
   a second transport downstream of and in-line with said first transport;
   a curved member positioned between said first and second transports;

entrance ribs with openings therein configured to provide a boundary condition for down-curled sheets while simultaneously allowing air flow to pass between said entrance ribs to enhance initial acquiring of up-curled sheets, and exit ribs configured to provide a boundary condition for down-curled sheets, while simultaneously providing a trajectory during hand-off of the sheets to said second transport, and wherein each of said entrance and exit ribs include a portion thereof extending away from said curved member in-line with said first and second transports.

an air flow device positioned adjacent said curved member; and wherein said air flow device is configured to apply a layer of high velocity air that follows said curved member to divert said sheets towards said curved member to thereby remove curl from leading edges of said sheets.

16. The apparatus of claim 15, wherein said curved member is a baffle.

17. The apparatus of claim 15, wherein said portion of said entrance and exit ribs extending away from said curved member in-line with said first and second transports includes openings therein.

18. The apparatus of claim 17, wherein said entrance and exit ribs are configured to constrain unsupported length of sheets by controlling trajectory of the sheets during transitions and simultaneously allowing the sheets to be safely acquired by said second transport.

* * * * *